United States Patent
Sze et al.

(10) Patent No.: US 7,731,499 B2
(45) Date of Patent: Jun. 8, 2010

(54) ULTRASOUND SIMULATOR FOR CRANIOSYNOSTOSIS SCREENING

(75) Inventors: Raymond W. Sze, Mercer Island, WA (US); Anh-Vu Ngo, Seattle, WA (US)

(73) Assignee: University of Washington, Seattle, WA (US)

( * ) Notice: Subject to any disclaimer, the term of this patent is extended or adjusted under 35 U.S.C. 154(b) by 916 days.

(21) Appl. No.: 10/729,364

(22) Filed: Dec. 5, 2003

(65) Prior Publication Data

US 2004/0175685 A1      Sep. 9, 2004

Related U.S. Application Data

(60) Provisional application No. 60/431,279, filed on Dec. 5, 2002.

(51) Int. Cl.
G09B 23/28 (2006.01)
(52) U.S. Cl. .................. 434/270; 434/262; 434/267; 434/274
(58) Field of Classification Search ......... 434/255–257, 434/262, 270, 267; D19/62
See application file for complete search history.

(56) References Cited

U.S. PATENT DOCUMENTS

| | | | | |
|---|---|---|---|---|
| 4,708,836 A | * | 11/1987 | Gain et al. | 264/40.1 |
| 4,773,865 A | * | 9/1988 | Baldwin | 434/268 |
| 5,609,485 A | * | 3/1997 | Bergman et al. | 434/262 |
| 2003/0208101 A1 | * | 11/2003 | Cecchi | 600/34 |

OTHER PUBLICATIONS

Webb, Linda. "Infant Skull Model and sculpted head" [retrieved on Jun. 9, 2002] Retrieved from Internet <URL:http://web.archive.org/web/20020609002343/http://www.lindawebb.com/infant_skull.htm>.*
Chelue, et al. "Fabrication of Medical Models from scan data via rapid prototyping techniques." [retrieved Mar. 4, 2001] Retrieved from Internet <URL:http://web.archive.org/web/20010304122738/http://www.deskartes.com/news/fabrication_of_medical_models_fr.htm>.*
Henry Gray. "The Skull" <retrieved from http://www.bartleby.com/107/33.html>.*

* cited by examiner

*Primary Examiner*—Xuan M Thai
*Assistant Examiner*—Robert J Utama
(74) *Attorney, Agent, or Firm*—Ronald M. Anderson (57) ABSTRACT

An ultrasound simulator to train radiologists and technologists to locate and recognize patent and fused cranial sutures. The model is formed, for example, using specially fabricated heads or from life-sized plastic doll heads. Simulated suture lines are cut in the heads in anatomically correct positions. The typical end-to-end morphology of the sagittal and metopic sutures and the typical beveled appearance of the paired coronal and lambdoid sutures are created by angling the cutting blade. The hypoechoic appearance of patent sutures in ultrasound images is simulated by filling the gaps that were formed by cutting with a hypoechoic material. Fused echoic sutures are simulated by leaving that portion of the doll's head uncut, or by filling the openings with an echoic material. When imaged using ultrasound, the portions cut and filled with a hypoechoic material are readily distinguishable from uncut portions, and from portions cut and filled with an echoic material.

25 Claims, 6 Drawing Sheets

NORMAL END-TO-END
APPEARANCE OF THE
SAGITTAL AND METOPIC
SUTURES

FIG. 2B

NORMAL BEVELED
APPEARANCE OF CORONAL
AND LAMBDOID SUTURES
ARROWS=ECHOGENIC BONE

FIG. 2C

FUSED SUTURE:
B=BONE

ULTRASOUND SIMULATOR FOR CRANIOSYNOSTOSIS SCREENING

RELATED APPLICATIONS

This application is based on a prior copending provisional application Ser. No. 60/431,279, filed on Dec. 5, 2002, the benefit of the filing date of which is hereby claimed under 35 U.S.C. §119(e).

FIELD OF THE INVENTION

The present invention generally relates to anatomically correct medical models, and more specifically pertains to a medical model that simulates the anatomical position of skull sutures in children to the extent that ultrasound images from such a model closely correspond to ultrasound images from actual patients, and to a method for using such a medical model for training radiologists and ultrasound technologists in the detection and examination of skull sutures in children.

BACKGROUND OF THE INVENTION

Abnormal head shapes in children can be caused by either positional molding (a change in head shape due to a child's preferential head position during sleep), or a more serious condition referred to as craniosynostosis (the premature fusion of a skull suture). The distinction is critical. Positional molding responds to minimally disruptive treatments such as frequent positional changes during sleep, or the use of a corrective helmet. On the other hand, craniosynostosis requires an extensive surgical procedure.

Computerized tomography (CT) is a diagnostic procedure that can be employed to determine if an abnormal head shape is caused by craniosynostosis. CT suffers from the disadvantages of relying on ionizing radiation (exposure to which in children is to be avoided when possible), frequently requiring the sedation of young children, and being expensive. An alternative screening method to detect and assess skull sutures in children with abnormally shaped heads would be desirable.

Ultrasound is a well accepted screening technology that uses sound waves, rather than ionizing radiation. In addition, ultrasound equipment is generally less costly than CT equipment, and much more readily available. Hence the cost of ultrasound screening is significantly less than CT screening. Sedation of patients is generally not required during ultrasound screening. However, as in any ultrasound screening procedure, thorough knowledge of anatomy and hands-on experience are important in acquiring accurate images and providing accurate interpretation. Medical training models that can be used to train radiologists and technicians to assess the skull sutures in children with abnormally shaped heads using ultrasound simply are not readily available.

It would be desirable to provide a lifelike model of an infant patient with fused and/or patent sutures that can be used to train radiologists and technicians to assess craniosynostosis in children using ultrasound. Such a model should enable trainees to acquire familiarity with the ultrasound scanning techniques and the required understanding of skull anatomy, and also to become familiar with the range of normal and abnormal findings they are likely to encounter with real patients.

SUMMARY OF THE INVENTION

A first aspect of the present invention is directed to an ultrasound trainer configured to train ultrasound operators to perform craniosynotosis screenings using ultrasound. The ultrasound trainer includes a generally life size model of a human head. The model includes at least one simulated patent skull suture. The echogenicity of each simulated patent skull suture enables the simulated patent skull suture to be readily distinguishable in an ultrasound image of the model.

The model is fabricated from a first material, and each simulated patent skull suture comprises an opening formed in the first material. Each opening corresponding to a simulated patent skull suture is filled with a second material, an echogenicity of the second material being different from the echogenicity of the first material.

Also, the first material is preferably echoic while the second material is hypoechoic. As a result, in an ultrasound image of the model, portions of the model corresponding to the first material will appear brighter than portions of the model corresponding to the second material.

In at least one embodiment, the scalp portion of the model is covered with a layer of the second material, which ensures that the scalp of the model is uniform, and that the sutures cannot be identified tactilely. A mixture of starch and glue is useful as the second material. Empirical models were produced using a commercially available mixture of starch and glue marketed as a children's toy under the name GOOOZE™.

The model includes a simulated skull suture representing each skull suture in a real human head, at anatomically correct locations. In at least one embodiment, a simulated patent coronal skull suture is represented by an appropriately located opening that is beveled. Similarly, a simulated patent lambdoid skull suture is represented by an appropriately located opening that is beveled. Openings representing simulated patent sagittal skull sutures and simulated patent metopic skull sutures are preferably formed such that opposed walls of each such opening exhibit an end-to-end configuration.

Such models can beneficially include at least one simulated fused skull suture. In at least one embodiment, each simulated fused skull suture is represented by leaving the material of the model intact at the appropriate location, such that a fused skull suture is represented by the lack of an opening in the model at the anatomical location of the skull suture. In another embodiment, each simulated fused skull suture is an opening formed in the model, and each opening corresponding to a simulated fused skull structure is filled with a third material. An echogenicity of the third material is preferably different than the echogenicity of the second material, such that each opening corresponding to a simulated fused skull suture can be readily distinguished from an opening corresponding to a simulated patent skull suture in an ultrasound image of the model. In at least one embodiment, the echogenicity of the third material is substantially similar to the echogenicity of the first material, such that in an ultrasound image of the model, portions of the model corresponding to the first material are not readily distinguishable from portions of the model corresponding to the third material. A synthetic elastomer can be used as the third material. In an empirical model, a synthetic elastomer marketed as a children's toy under the name SILLY PUTTY™ was used for the third material.

The scalp of the model is preferably covered with an opaque material so that a trainee cannot visually determine whether a specific skull suture is patent or fused, without obtaining an ultrasound image of the model. In some embodiments, the cover is removable so that the model can be used as a training tool to teach students about the anatomical locations of skull sutures with the cover removed. With the cover in place on the model, the model can be used as an ultrasound teaching aid.

An empirical model was produced using a doll's head by forming openings in the doll's head for the simulated skull sutures.

Another aspect of the present invention is directed to a method for making an ultrasound trainer configured to train ultrasound operators to perform craniosynotosis screenings using ultrasound. The method includes the steps of providing a life size model of a human head, and forming at least one simulated patent skull suture in the model. Preferably, each type of skull suture that might be present in human anatomy is represented in the model. A doll's head is preferably employed as the model.

Simulated skull sutures can be formed in the model by making openings in the model at anatomically correct locations for each simulated patent skull suture. If the opening to be formed corresponds to either a simulated patent coronal skull suture or a simulated patent lambdoid skull suture, the opening is beveled to duplicate actual human anatomical features. If the opening to be formed corresponds to either a simulated patent sagittal skull suture or a simulated patent metopic skull suture, the opening is formed such that opposed walls of the opening exhibit an end-to-end configuration, again to duplicate actual human anatomical features.

Each opening corresponding to a simulated patent skull suture is preferably filled with a hypoechoic material. The echogenicity of the hypoechoic material enables each opening corresponding to a simulated patent skull suture to be readily distinguishable in an ultrasound image of the model, as long as the material from which the model is formed has a different echogenicity than the fill material. Preferably, the echogenicity of the fill material is lower than the echogenicity of the model material, so that in an ultrasound image of the model, the fill material appears darker than the model material.

The method for making a model may also include the step of covering the scalp of the model with a layer of the fill material, so that the scalp of the model has a uniform feel and appearance.

Another step of the method provides for forming at least one simulated fused skull suture in the model. In at least one embodiment, each simulated fused skull suture in the model is formed by marking the model to indicate the correct anatomical location of the simulated fused skull suture, without forming an opening in the model at that location. In other embodiments, the step of forming at least one simulated fused skull suture in the model includes the steps of forming an opening in the model at an anatomically correct location for each simulated fused skull suture, and filling each opening thus formed with a material whose echogenicity is different than the echogenicity of the material used to fill the openings corresponding to the simulated patent skull sutures. Thus, each opening corresponding to a simulated fused skull suture can be readily distinguished from an opening corresponding to a simulated patent skull suture in an ultrasound image of the model. In one embodiment, the material used to fill the openings corresponding to a simulated fused skull suture has an echogenicity similar to that of the material forming the model, so that in an ultrasound image of the model, except for those portions corresponding to simulated patent skull sutures, the simulated fused skull sutures are not readily distinguishable from other portions of the model.

Still another aspect of the present invention is directed to a method of using an ultrasound trainer to train ultrasound operators to perform craniosynotosis screenings using ultrasound. Such a method includes the steps of providing a life size model of a human head that includes a plurality of simulated skull sutures disposed at anatomically correct locations. An ultrasound imaging tool is then used to collect an image from each simulated skull suture in the model, and the image from each simulated skull suture is evaluated to determine if the simulated skull suture is patent or fused.

Preferably, the plurality of simulated skull sutures include a simulated sagittal skull suture, a simulated metopic skull suture, a simulated coronal skull suture, and a simulated lambdoid skull suture. In most embodiments at least one simulated skull suture will be fused, although models that include only patent sutures can be employed to determine if the operator can correctly determine that no simulated fused skull sutures are present in the model.

Preferably, the step of using an ultrasound imaging tool to collect an image from each simulated skull suture includes the step of collecting an image from the simulated sagittal skull suture at the anterior, middle, and posterior locations. Also preferably, the step of using an ultrasound imaging tool to collect an image from each simulated skull suture includes the step of collecting an image from the simulated coronal skull suture at the right medial, right lateral, left medial, and left lateral locations. It is further preferred for the step of using an ultrasound imaging tool to collect an image from each simulated skull suture to include the step of collecting an image from the simulated lambdoid skull suture at the right medial, right lateral, left medial, and left lateral locations. It is even more preferable for the step of using an ultrasound imaging tool to collect an image from each simulated skull suture to include each of the following steps: collecting an image from the simulated sagittal skull suture at the anterior, middle, and posterior locations; collecting an image from the simulated metopic skull suture; collecting an image from the simulated coronal skull suture at the right medial, right lateral, left medial, and left lateral locations; and collecting an image from the simulated lambdoid skull suture at the right medial, right lateral, left medial, and left lateral locations.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The present invention is an ultrasound simulator that can be used to train radiologists and ultrasound technicians in the anatomy of pediatric cranial sutures and in techniques for using ultrasound as a screening tool to detect craniosynotosis. A life sized model of a human head includes simulated skull sutures that can be detected using ultrasound. Additional aspects of the present invention relate to methods for making and using such a model.

In the following description and the claims that follow, it will be understood that the term "patent" means a skull suture in which a gap exists between adjacent portions of the skull. Normal skull sutures have such a gap. Abnormal skull sutures are closed, and in the following description and the claims that follow, it will be understood that the term "fused" is employed to refer to such abnormal, or closed, skull sutures. The term "life size" is meant to refer to a model that simulates a portion of human anatomy such that the model is substantially the same size and shape as the portion of human anatomy upon which the model is based. Note that while there is certainly variation within human anatomy, a life sized model will be recognizable by users as being substantially the size and shape one would expect, given the range of variations in human anatomy. Craniosynotosis screening is generally only performed on young children (up to twelve months in age). Thus, the term life size should be understood to preferably encompass the infant stage in the human life cycle.

Figure 1A:
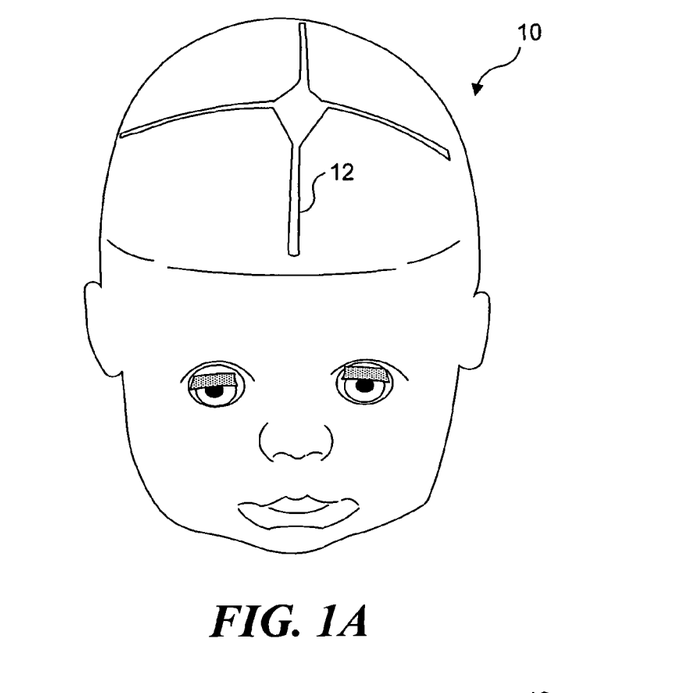
FIG. 1A schematically illustrates a doll's head in which openings corresponding to skull sutures have been made, producing a simulator for use in training ultrasound technicians in craniosynotosis screening, in accord with the present invention.

FIG. 1A schematically illustrates a model 10 that includes a plurality of simulated patent skull sutures 12. Model 10 is life size, based on the average size of a human infant skull (craniosynotosis screenings are most often performed on infants and young children). As noted above, larger models can be provided for other stages of human development (teens, adults). Preferably, each skull suture present in normal human anatomy is simulated in model 10, either as a patent skull suture or a fused skull suture.

Simulated skull sutures can be produced in a number of ways. In a simple embodiment, openings are made in a doll's head in the correct locations. If a simulated fused skull suture is desired, then no opening is made. Of course, specially built models can be employed in place of a doll's head. However, doll's heads of appropriate sizes are lifelike, readily available, and are inexpensive and thus are very suitable as models.

When a model having openings representing patent skull sutures is scanned using ultrasound, the absence of material in the openings can be detected. If a location on the model corresponding to a sagittal skull suture is scanned, and there is an opening in that position, the change in echogenicity between the opening and the material of the model will be detected, indicating that the simulated sagittal skull suture is patent. If, however, the location on the model corresponding to a sagittal skull suture is scanned and the sonographic image shows no difference in echogenicity, then no opening is present, and the image will be interpreted as indicating that the simulated sagittal skull suture is fused.

In a more preferred embodiment, each opening corresponding to a simulated patent skull suture is filled with a material having an echogenicity that is substantially different than the echogenicity of the material from which the model is made. The greater the difference in echogenicity, the more apparent the simulated patent skull suture will be in an ultrasound image. The absence of material in an opening will result in some difference in echogenicity as compared with a portion of the model in which no opening has been formed, so if such an opening is filled with a material to cause the openings to be more visible in an ultrasound image, the difference is the echogenicity of the fill material and the material from which the model is constructed should result in an ultrasound image in which the opening is more readily distinguished than it would have been without the opening being filled.

An empirical model was constructed using a doll's head made from a plastic material. Openings representing patent skull sutures were formed in the doll's head at anatomically correct positions. The openings were filled with a children's play product marketed under the name GOOOZE™. In ultrasound images of the doll's head, the simulated patent skull sutures filled with GOOOZE™ were easily identifiable. Indeed, as will be discussed in detail below, the ultrasound images of the doll's head were remarkably similar to ultrasound images of human patients. While GOOOZE™ is a proprietary formula, a similar patent skull suture fill material can be produced using a mixture of starch and glue. The glue can be either a casein-based glue or a synthetic resin-based glue.

A recipe for a suitable suture fill material is as follows:
1 tablespoon of liquid starch;
2 tablespoons of white glue.
Slowly pour the glue mixture on top of the liquid starch. Allow the mixture to stand for 5 minutes or until the glue absorbs the liquid starch. Remove the mixture from the bowl and knead until the desired consistency is achieved.

It should be understood that the actual material selected as a patent skull suture fill material is less critical than ensuring that the patent skull suture fill material has a different echogenicity than that of the model. While the use of an existing doll's head made the preparation of an empirical model simple, it should be understood that rather than using an existing doll's head, a specially built model could be fabricated. If specifically fabricated as a craniosynotosis screening model, the fabricator can control the selection of the material used for the model, as well as the selection of the material used for the patent skull suture fill. Thus, a fabricator can ensure that each material is easily distinguished from the other in an ultrasound image. Many different types of materials can be used to produce models, including wood, plaster, ceramics, and polymers. Polymers are likely to be a particularly preferred material for this application, because injection molding techniques can be used to produce large numbers of models at a reasonable cost.

While it is important that the model material and the patent skull suture fill material can be easily distinguished from each other in an ultrasound image, it is also desirable that the ultrasound images of the model realistically simulate the ultrasound image of an actual patient. For example, in an ultrasound image of an actual patient, bone will show up as a bright area, tissue as darker shadowy regions, and a patent skull suture will appear as a shadowy gap between brighter areas (representing bone). Thus, it is preferable for the model material to be more echogenic than the patent skull suture fill material. A material that is very echogenic will reflect a relatively large amount of ultrasound waves (thus producing a bright image), while a material that is less echogenic will reflect ultrasound waves to a lesser extent. Bone is very echogenic, while tissue is not very echogenic. A material that reflects ultrasound waves poorly is referred to as hypoechoic. The patent skull suture fill material is preferably hypoechoic, while the model material is preferably more echogenic. More preferably, the model material produces an ultrasound image similar to bone (i.e., a white image), and the patent skull suture fill material produces an ultrasound image similar to the soft tissues that fill the openings between bony plates in the skull (i.e., the tissues within patent skull sutures).

The patent skull suture fill material desirably will be pliable and readily moldable, so that it can be placed into the openings and smoothed to provide a uniform fill. The material ought not to be too liquid, as such a material would not be retained in the openings, as required. Further, a desirable material will provide a tactile sensation similar to that of the skull portion of the model, to ensure that a trainee does not identify the patent skull suture simply by feel, rather than by properly interpreting an ultrasound image. If the patent skull suture fill material can be tactilely distinguished from the skull portion of the model, a simple solution is to cover the entire skull surface of the model with the patent skull suture fill material, which will prevent the location of the patent skull sutures from being identifiable simply by feel, because the entire skull portion of the model will have the same feel. When the patent skull suture fill material is hypoechoic, an ultrasound image of the model will typically include a hypoechoic artifact at the periphery of the skull, which actual ultrasound images also include, due to the hypoechoic skin and tissue layer surrounding the skull.

The patent skull suture fill material will preferably be sufficiently malleable to fill the openings, yet sufficiently firm to resist dispersion with the heavy pressure frequently applied by trainees during scanning with an ultrasound probe. In the empirical model produced with a doll's head using GOOOZE™ for a fill material, the GOOOZE™ material sometimes shifted due to the pressure applied by trainees, so that before the model was used by another trainee, the GOOOZE™ fill material needed to be gently repositioned. To increase the firmness of the GOOOZE™ material to enable it to withstand greater pressure applied by the trainees, the model was chilled between uses. A similar chilling procedure can be employed with the starch and glue mixture noted above, should additional firmness be desired. If a starch and glue mixture is employed, the proportions can be varied to achieve a mixture that provides desirable properties, such as firmness and malleability.

The above discussion assumes that most of the model is produced from the same material (i.e., a plastic used to make a doll's head). It should be noted that the model is intended to be used for craniosynotosis screening. As such, the portion of the model that will be ultrasonically scanned is the skull portion. Thus, the above references to the material of the model are particularly intended to refer to the skull portion of the model. While it likely will be more expensive to produce a model in which the skull portion is fabricated of a different material than the facial portion of the model, such a model is possible, and it should be understood that the above discussion as to preferred model materials is directed to the skull portion of the model that is ultrasonically imaged during craniosynotosis screening. Thus, models that use one material for the skull portion, and one or more other materials for the facial or other portion of the model, are encompassed by the present invention.

The above description explains how simulated patent skull sutures can be produced so that they are readily distinguishable in ultrasound images. While such a model would be useful in training radiologists and sonographers about normal skull sutures, an important aspect of the present invention relates to detecting abnormal or fused skull sutures. While a model having only simulated patent skull sutures will have some utility, it would be more desirable to provide a model that includes, or has the ability to include, simulated fused skull sutures as well. It was noted above that one method of simulating a fused skull suture would be to simply fail to make an opening at the appropriate anatomical location of a skull suture, and the lack of an opening would then be identified in the ultrasound image as a fused skull suture. In some embodiments, a simulated fused skull suture is produced by filling an opening with a simulated fused skull suture fill material that has an echogenicity sufficiently different from the simulated patent skull suture fill material, so that simulated fused skull sutures and simulated patent skull sutures are readily distinguishable in ultrasound images of the model. The simulated fused skull suture fill material should preferably be echogenic (i.e., the material will show up as a bright spot in an ultrasound image), while the simulated patent skull suture fill material will be hypoechoic.

In one embodiment, the simulated fused skull suture fill material has an echogenicity that closely corresponds to that of the material from which the skull portion of the model is formed. Thus, in an ultrasound image, the simulated fused skull suture blends in with the skull portion of the model, and the radiologist/sonographer would determine that a simulated fused skull suture was present in a specific anatomical location, because a simulated patent skull suture was absent at that location.

The use of a simulated fused skull suture fill material is beneficial because it enables a model that includes only simulated patent skull sutures to be modified to include a simulated fused skull suture. If only one style of model were available (for example, a model in which only the sagittal skull suture was fused, and all other skull sutures were patent), then students might quickly learn that pattern, and the identification of specific skull suture as patent or fused could be determined based on the knowledge of the pattern, rather than on a correct interpretation of an ultrasound image. The availability of simulated fused skull suture fill material means that a model containing only simulated patent skull sutures can be readily modified to include a simulated fused skull suture, by removing the simulated patent skull suture fill material from one or more openings, and replacing that material with the simulated fused skull suture fill material. In this manner, one model could be used by a student to gain familiarity with patent skull sutures, and that model could be modified by an instructor to include a simulated fused skull suture, which the student would then attempt to identify using ultrasound.

In the empirical model discussed above, based on the use of a doll's head, it was determined that a synthetic moldable polymer could be used as the simulated fused skull suture fill material. The specific moldable polymer employed was also a children's play material, specifically, a moldable material marketed under the trademark SILLY PUTTY™. The general composition of that product is well known, and it includes the following materials:

- 65% dimethyl siloxane, hydroxy-terminated polymers with boric acid;
- 17% silica, quartz crystalline;
- 9% thixotrol ST;
- 4% polydimethylsiloxane;
- 1% decamethyl cyclopentasiloxane;
- 1% glycerine; and
- 1% titanium dioxide.

Again, it will be understood that the specific material selected as the simulated fused skull suture fill material should have an echogenicity that is sufficiently different from the simulated patent skull suture fill material that the two materials can be readily distinguished from each other in an ultrasound image. The simulated fused skull suture fill material is preferably moldable, and can be readily formed in the opening that will be used to simulate a fused skull suture. Preferably, the echogenicity of the simulated fused skull suture fill material is matched to the material from which the skull portion of the model is formed, so that the simulated fused skull suture fill material and the skull portion of the model cannot be readily distinguished from each other in an ultrasound image.

In one embodiment, each opening intended to represent a simulated fused skull suture can have a plastic cover placed over the opening, where the plastic cover is an echogenic material. Preferably, the plastic cover will have an echogenicity similar to that of the material from which the scalp portion of the model is fabricated, so that in an ultrasound image, the plastic cover blends in with the material of the model. In such an embodiment, the simulated patent skull suture fill material would not need to be removed, because the cover can simply be placed over the simulated patent skull suture fill material, and the ultrasonic image would indicate that particular simulated skull suture was fused. If the plastic cover material is sufficiently thin, or if a layer of the simulated patent skull suture fill material is placed over the cover and the balance of the scalp area, it is likely that the presence of such a cover would not be readily identifiable by touch.

Referring once again to FIG. 1A, the doll's head used to produce model 10 includes two eyes, two ears, a nose and a mouth (even eyelashes). While collectively those features enhance the lifelike appearance of the model, it should be understood that each such anthropomorphic element is not critical to achieving a functional model. While a lifelike realistic model is preferred, one or more of these elements can be eliminated, as long as the ultrasound image of the model enables simulated patent skull sutures to be differentiated from simulated fused skull sutures.

Figure 1B:
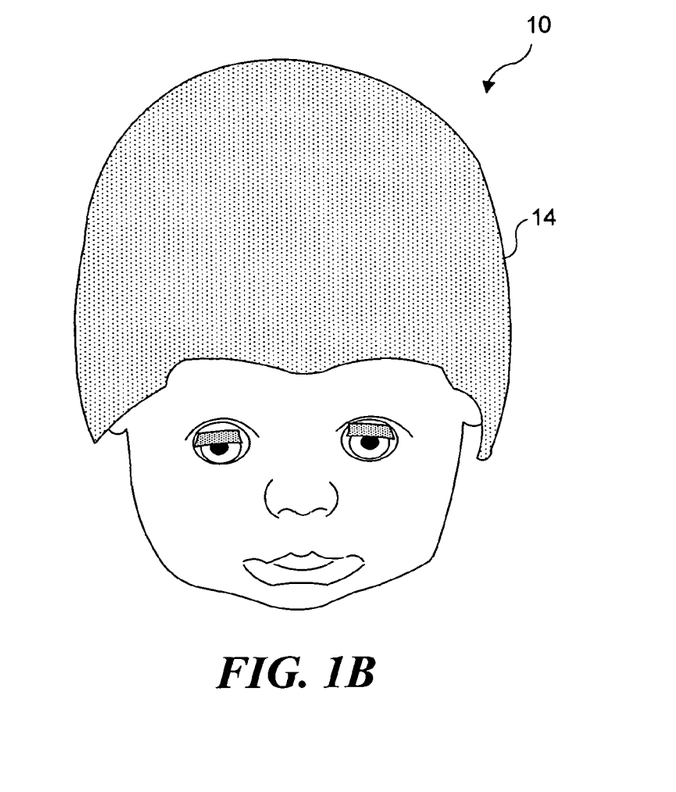
FIG. 1B schematically illustrates an opaque covering added to the simulator of FIG. 1A, to obscure the skull sutures from trainees during use of the simulator.

FIG. 1B schematically illustrates a cover 14 that has been placed over the skull portion of model 10, to prevent a trainee from visually distinguishing simulated patent skull sutures from simulated fused skull sutures without using ultrasound. Cover 14 is preferably hypoechoic, so that cover 14 provides little if any artifact in an ultrasound image. Cover 14 should not be so echogenic that the presence of cover 14 interferes with the imaging of any simulated patent skull sutures or simulated fused skull sutures disposed underneath cover 14. A thin opaque layer of plastic was used to implement cover 14 in the empirical model constructed using a doll's head. Cover 14 can be sized and shaped so as to generally simulate hair, or a skull cap. Preferably, cover 14 is removable so that model 10 can be used by students to become familiar with the anatomical positions of skull sutures. With cover 14 in place, the model can be used to determine whether a trainee can properly locate the simulated skull sutures, and then obtain and interpret images of simulated skull sutures in model 10. If cover 14 is sufficiently thick, the layer of simulated patent skull sutures fill material coated onto the entire skull portion of the model can be eliminated, and the trainee will still be prevented from tactilely identifying a particular simulated skull suture as patent or fused.

In addition to using a doll's head (or other model) in which openings corresponding to skull sutures are made, a model can be molded or otherwise fabricated with grooves already formed in anatomically correct locations to simulate patent skull sutures. The grooves can be variegated in dimension to mimic the patterns found in actual skull sutures. In one embodiment, the grooves are pre-filled with either a simulated patent skull sutures fill material or a simulated fused skull sutures fill material, as described above. In another embodiment, the grooves are left unfilled. A trainer can then selectively fill the grooves with a simulated patent skull sutures fill material or a simulated fused skull sutures fill material, to achieve a customized model having a configuration of patent and fused simulated skull sutures as determined by the trainer. The fill materials will preferably be readily removable from the grooves, so that the same model can be reused again and again, with the configuration of the fused and patent skull sutures being changed as desired.

Figure 2A:
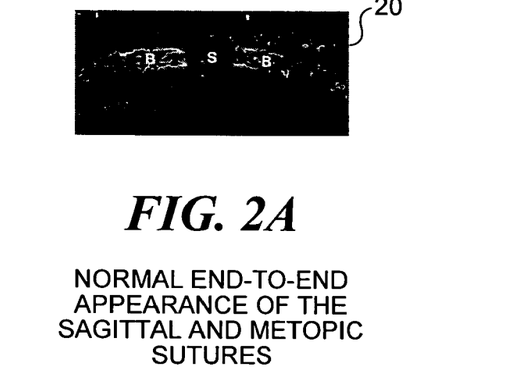
FIG. 2A is an ultrasound image from an actual patient, showing an end-to-end skull suture, with the echogenic bone labeled.
Figure 2B:
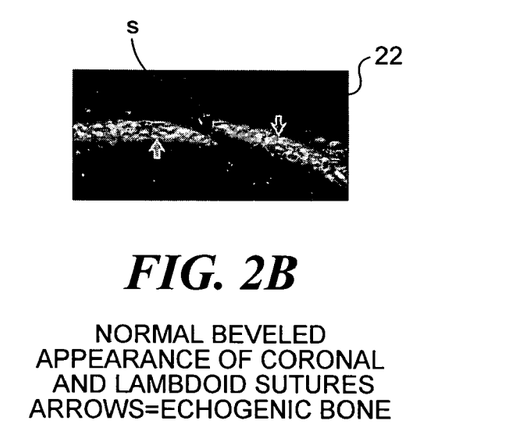
FIG. 2B is an ultrasound image from an actual patient, showing a beveled skull suture, with the echoic bone and the hypoechoic skull suture labeled.
Figure 2C:
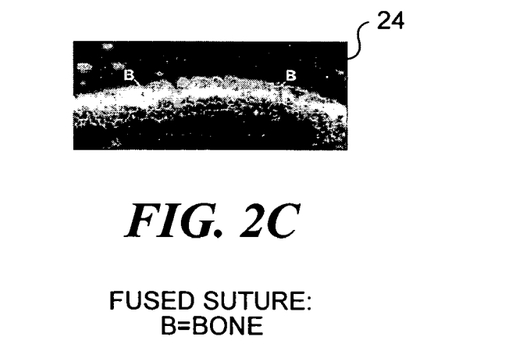
FIG. 2C is an ultrasound image from an actual patient, showing a fused suture, with the echoic bone labeled.

FIGS. 2A-2C are ultrasound images of human skulls. FIG. 2A is an ultrasound image 20 that shows the normal end-to-end appearance of patent sagittal and patent metopic skull sutures. Note that the bony skull plates show up as bright elements in the image (labeled "B") while the patent skull suture is hypoechoic and is identifiable as a shadow gap (labeled "S"), disposed between opposed bony plates. The opposed ends of the bony plates are generally flat parallel faces.

The end-to-end configuration of sagittal and metopic patent skull sutures is dramatically different than the beveled configuration of coronal and lambdoid patent skull sutures. FIG. 2B is an ultrasound image 22 of a human skull that shows this beveled appearance. Echogenic bone is indicated by arrows. The patent skull suture is hypoechoic and again is identifiable as a shadowy gap (labeled "S"), disposed between opposed bony plates. The opposed ends of the bony plates are generally beveled faces. Thus, the orientation of opposed bones can be used as a clue to identify whether a specific patent suture is sagittal, metopic, coronal, or lambdoid. While one familiar with anatomy ought to be able to identify a skull suture merely by its location, the configuration of the bones is particularly useful in identifying a suture from an ultrasound image, if the position of the imaging probe is no longer known (e.g., if inspecting a stored and unlabeled image).

When a model is being fabricated, any opening or groove formed in the model to represent a patent skull suture is preferably formed to include the appropriate end-to-end or beveled appearance, based on the particular skull suture being simulated. When an opening is cut in a model (such as a doll's head) the knife or cutting blade can be controlled to achieve either a flat (end-to-end) cut or a beveled cut.

FIG. 2C is an ultrasound image 24 of a fused skull suture. The bony plates appear as a continuous mass with no gap. Echogenic bone is labeled "B". Because the skull suture is fused, no beveled or end-to-end appearance is present.

Figure 3:
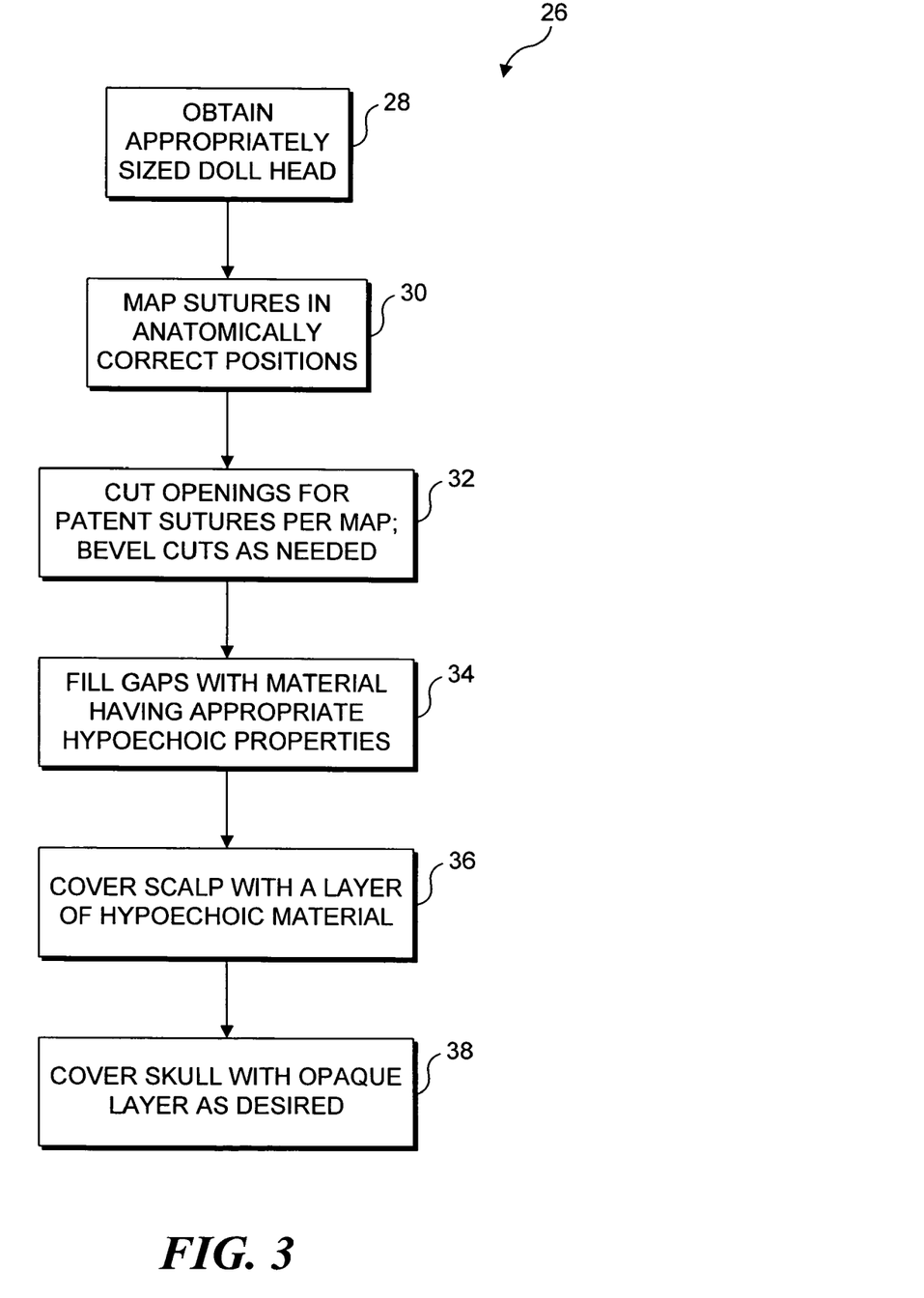
FIG. 3 is a flowchart of the sequence of logical steps employed to produce the simulator of FIG. 1A.

FIG. 3 is a flow chart 26 of a sequence of logical steps that can be used to produce a model in accord with the present invention. In a block 28, an appropriately sized model of a human head is obtained or fabricated. As noted above, a doll's head can be employed. In a block 30, the position of skull sutures is mapped onto the model, based on the anatomically proper position of skull sutures in human skulls.

In a block 32, openings are formed in the model for each simulated patent skull suture. Preferably, the openings will be about 1 mm in width. Fused patent sutures can be simulated by the absence of an opening at the anatomical position corresponding to a specific suture. In some cases, fused patent sutures will be simulated by filling an opening with an echoic material having an echogenicity closely matching the echogenicity of the model (or doll's head). In such an embodiment, openings for each simulated fused skull suture will also be made. Further, the model can include an opening for each skull suture, and the opening will then be filled with a hypoechoic material (to simulate patent skull sutures) or an echogenic material (to simulate fused skull sutures) at a later time. As the openings are formed per block 32, care is taken to bevel the edges of openings/grooves corresponding to coronal and lambdoid skull sutures, while openings/grooves corresponding to sagittal and metopic skull sutures should be formed so that opposed sides of the openings exhibit an end-to-end appearance.

Preferred models (such as doll's heads) are hollow. While solid models could theoretically be fabricated, such a solid structure is not likely to enable a realistic simulation to be achieved, because the interior portion of the solid model will not produce an ultrasound image corresponding to the human skull. When using a hollow model, some care must be taken such that the fill material does not collapse into the hollow portion of the model through the suture openings. In the empirical model produced using a doll's head, GOOOZE™, and SILLY PUTTY™, both fill materials were sufficiently pliable and tacky that the openings were able to be filled without the fill materials sloughing away into the hollow center of the doll's head. If a more motile fill material is employed, the hollow center can be filled with the hypoechoic material (which preferably provides an ultrasound image similar to the ultrasound image of soft tissue). Instead of filling the void, a hypoechoic backing material can be placed into the opening to keep the fill material from moving from the opening(s) to the center void. Of course, the hypoechoic backing material selected should not generate any undesirable artifacts in an ultrasound image of the model. Duct tape can be beneficially employed as such a backing material.

Referring once again to flowchart 26 of FIG. 3, in a block 34, each opening corresponding to a simulated patent skull suture is filled with the selected hypoechoic material. If any of the openings are to be used to represent a simulated fused skull suture, the opening can be filled with the echogenic material selected for that purpose. In a block 36, the scalp is covered with a layer of the hypoechoic material used for the fill for the simulated patent skull sutures. In the empirical model fabricated from a doll's head, and using GOOOZE™ and SILLY PUTTY™ fill materials, the thickness of the fill material was about 5 mm. In the empirical model, the GOOOZE™ was chilled after it had been applied, to increase its firmness and prevent the material from moving out of the desired position. Covering the scalp of the model is an optional step. An appropriate covering can enhance the ultrasound image of the model by providing a hypoechoic layer over the periphery of the scalp, simulating a skin layer, but even if such a layer is missing, simulated patent skull sutures and simulated fused skull sutures will still be distinguishable in the ultrasound image.

In a block 38, an opaque cover is placed over the scalp of the model to prevent a trainee from visually determining the relative positions of simulated fused and patent skull sutures, rather than by inspecting an ultrasound image of the model.

As noted above, it may be desirable to allow trainees to initially see the simulated skull sutures, to aid in learning the anatomical positions of the skull sutures. Thus, a model in accord with the present invention will not necessarily include an opaque cover, or may include an opaque cover that is removable. In at least one embodiment, a clear cover is provided to enable a trainee to observe the simulated skull sutures without using ultrasound, while protecting the fill materials placed into the openings/grooves.

Figure 4A:
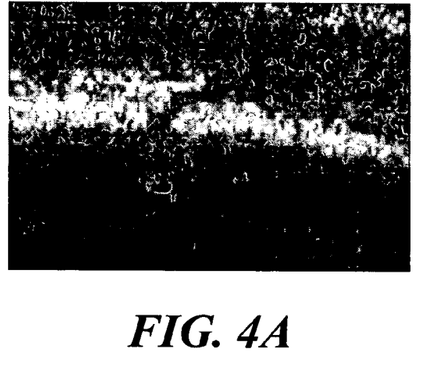
FIG. 4A is another ultrasound image from an actual patient, showing a beveled skull suture.
Figure 4B:
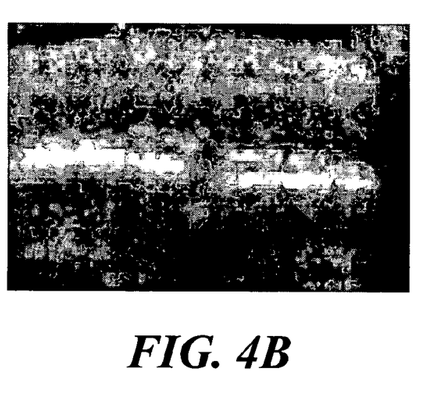
FIG. 4B is yet another ultrasound image from an actual patient, showing an end-to-end skull suture.
Figure 4C:
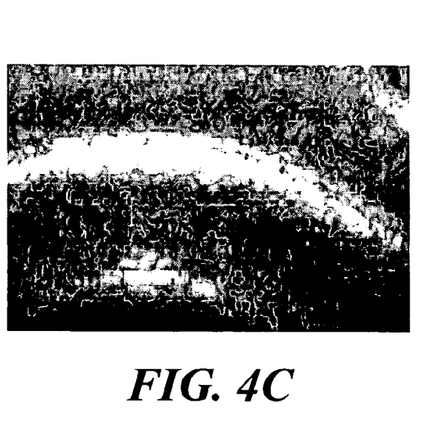
FIG. 4C is still another ultrasound image from an actual patient, showing a fused suture.
Figure 5A:
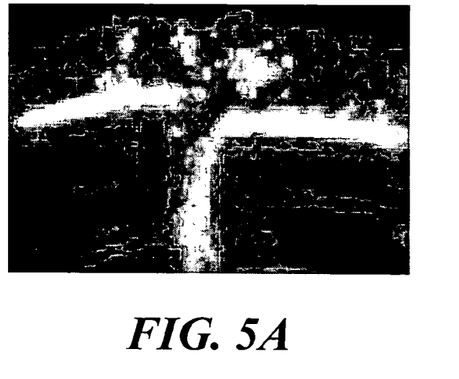
FIG. 5A is an ultrasound image from a simulator fabricated in accord with the present invention, showing a simulated beveled skull suture.
Figure 5B:
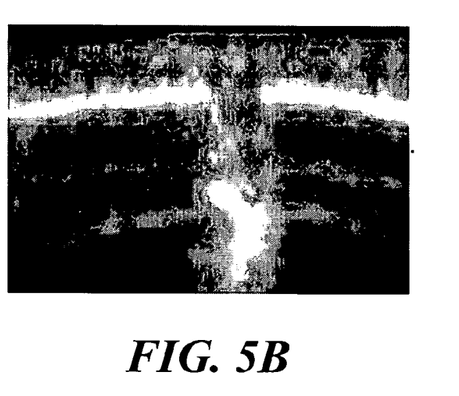
FIG. 5B is an ultrasound image from a simulator fabricated in accord with the present invention, showing a simulated end-to-end skull suture.
Figure 5C:
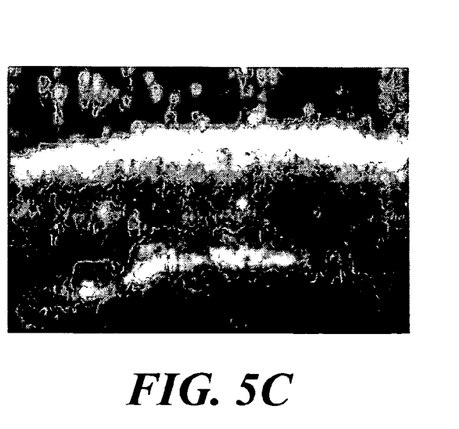
FIG. 5C is an ultrasound image from a simulator fabricated in accord with the present invention, showing a fused suture.

FIGS. 4A-4C are ultrasounds of actual patients, while FIGS. 5A-5C are ultrasounds of the empirical model produced using the doll's head, and GOOOZE™ and SILLY PUTTY™ fill materials. The side-by-side comparison of FIGS. 4A-4C with FIGS. 5A-5C shows how well ultrasound images of simulated skull sutures correspond to ultrasound images of actual skull sutures in patients. FIG. 4A shows a beveled patent skull suture in an actual patient, while FIG. 5A shows a simulated beveled patent skull suture from the empirical model. FIG. 4B shows a patent skull suture having an end-to-end configuration in an actual patient, while FIG. 5B shows a simulated patent skull suture from the empirical model having an end-to-end configuration. Finally, FIG. 4C shows a fused skull suture in an actual patient, while FIG. 5C shows a simulated fused skull suture from the empirical model.

Using empirical models produced as described above (using doll's heads, and GOOOZE™ and SILLY PUTTY™ fill materials) and a training program described in more detail below, radiology residents and fellows using the simulators achieved a documented 26% improvement (from 61% to 87%) in scanning accuracy and a 12% improvement (from 79% to 91%) in interpretive accuracy. The training program included a pretest on three different test simulators (with the simulated sutures covered by an opaque layer), a training session on a simulator (with the simulated sutures visible without using ultrasound), and post test on three different test simulators (with the simulated sutures covered by an opaque layer).

Figure 6:
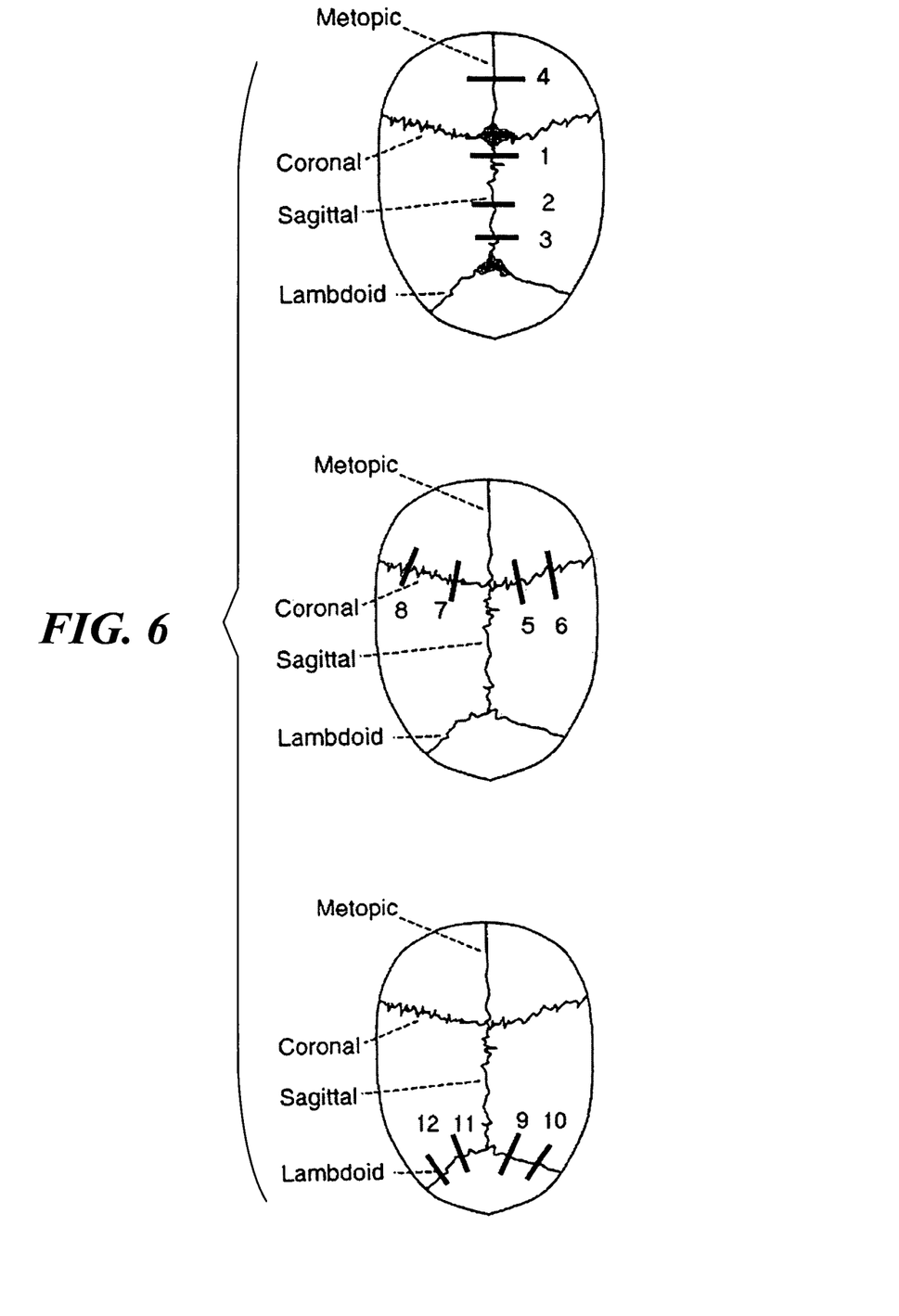
FIG. 6 indicates twelve locations to be scanned using ultrasound in a preferred ultrasonic screening for craniosynotosis.

FIG. 6 includes plan views that schematically illustrate a screening protocol requiring the acquisition of 12 representative images over the five major skull sutures (sagittal, metopic, coronal (2), and lambdoids (2). Note preferred areas of acquisition are numbered 1-12 in FIG. 6. Standard ultrasound coupling gel is applied to a probe head (or the model surface), and the images are obtained with the probe held perpendicular to the expected orientation of the skull sutures. A patent suture reveals a dark gap between the bright skull plates, and a fused suture reveals obliteration of this dark gap.

The model combined with the scanning procedure discussed above is used to teach trainees to optimize scanning techniques, and to recognize normal and abnormal suture appearance. The model enables trainees to gain the skill and experience required to increase the speed of their performance during scanning of actual patients. Since most of the screening for craniosynotosis is performed on children (who ought not be sedated for such a procedure), the ability to rapidly acquire the correct images is valuable.

Figure 7:
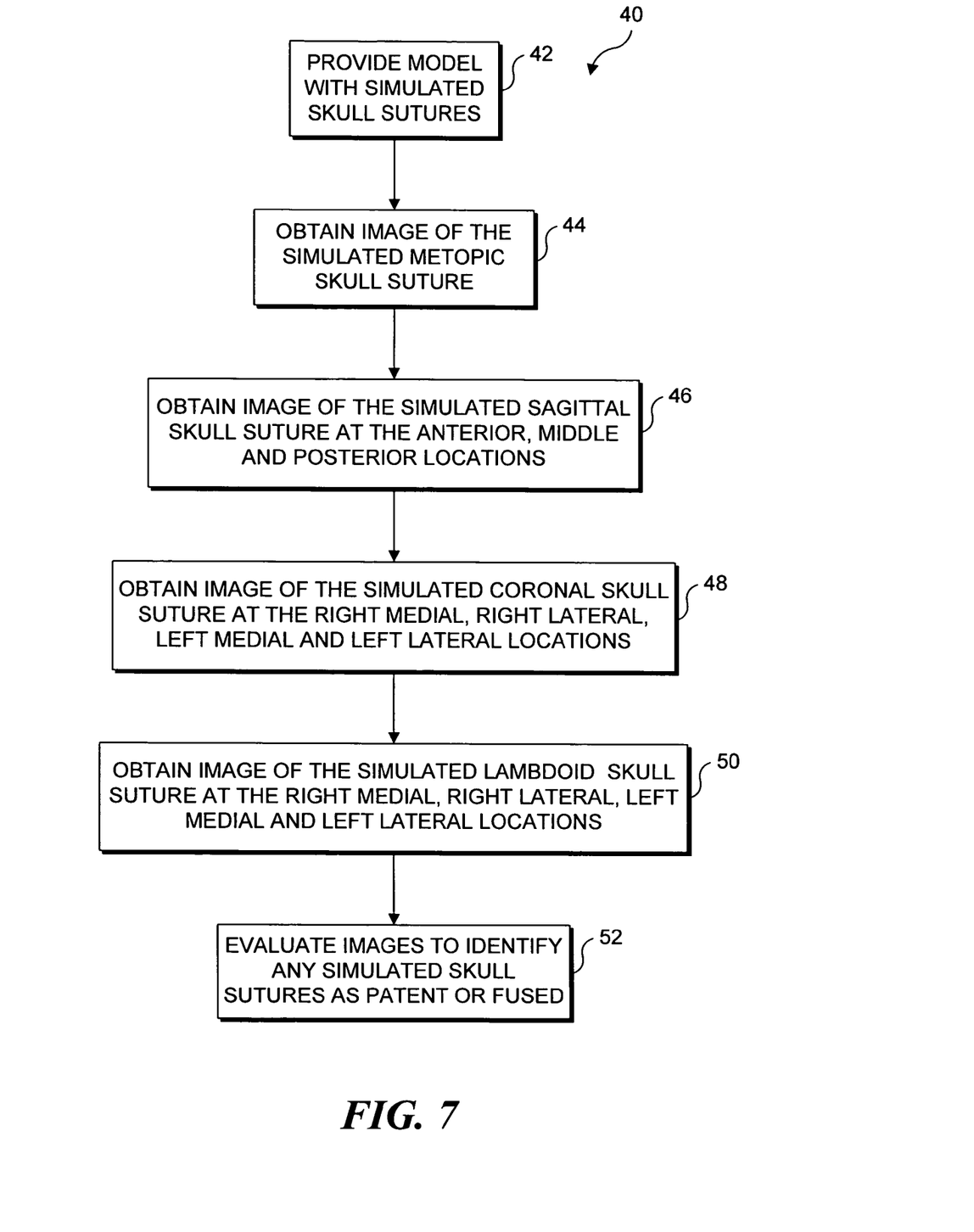
FIG. 7 is a flowchart of the sequence of logical steps employed to use the simulator of FIG. 1A to simulate an ultrasonic screening for craniosynotosis.

FIG. 7 illustrates a flowchart 40 showing the sequence of logical steps employed to use the simulator of FIG. 1A to simulate an ultrasonic screening for craniosynotosis. In a block 42, a trainee is provided a model including simulated skull sutures. Preferably, each skull suture found in a real patient will be present in the model, either as a simulated patent skull suture or as a simulated fused skull suture. Standard ultrasound coupling gel is applied to a probe head (or the model surface), and the images are obtained with the probe held perpendicular to the expected orientation of the skull sutures. In a block 44, the trainee obtains an image of the simulated metopic skull suture. In a block 46, the trainee obtains an image of the simulated sagittal skull suture at the anterior, middle, and posterior locations. In a block 48, the trainee obtains an image of the simulated coronal skull suture at the right medial, right lateral, left medial, and left lateral locations. In a block 50, the trainee obtains an image of the simulated lambdoid skull suture at the right medial, right lateral, left medial, and left lateral locations. The order in which the images are obtained can be varied (i.e., left medial images can be obtained before right medial images, and lambdoid images can be obtained before sagittal images, etc.). In a block 52, each image is evaluated to determine if the corresponding simulated skull suture is patent or fused. If desired, each image can be analyzed immediately after it has been obtained and before the next image is obtained, instead of obtaining all the images before analyzing any of them.

It should be understood that the above procedure can be modified to obtain ultrasound images of skull sutures in actual patients, as opposed to ultrasound images of simulated skull sutures in models in accord with the present invention.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A medical simulator for training ultrasound operators to perform craniosynostosis screenings using medical ultrasound, comprising a substantially life size model of a human infant head, a skull portion of the model being primarily fabricated from a first material, said skull portion including at least one simulated patent skull suture comprising a second material, the second material having an echogenicity substantially lower than an echogenicity of said first material, such that each simulated patent skull suture can be readily distinguished in an ultrasound image of said model, with portions of the model corresponding to the first material appearing relatively brighter and portions of the model corresponding to the second material appearing relatively darker in the ultrasound image, an interior volume of the model being substantially empty.

2. The medical simulator of claim 1, wherein the second material comprises a mixture of a starch and a glue.

3. The medical simulator of claim 2, wherein the glue is a casein-based glue.

4. The medical simulator of claim 2, wherein the glue is a synthetic resin-based glue.

5. The medical simulator of claim 1, wherein at least one simulated patent skull suture corresponds to at least one of a simulated patent coronal skull suture and a simulated patent lambdoid skull suture, and wherein each opening corresponding to a simulated patent coronal skull suture is beveled, and each opening corresponding to a simulated patent lambdoid skull suture is beveled.

6. The medical simulator of claim 1, wherein at least one opening corresponding to a simulated patent skull suture corresponds to at least one of a simulated patent sagittal skull suture and a simulated patent metopic skull suture, so that opposed walls of each opening corresponding to a simulated patent sagittal skull suture exhibit an end-to-end configuration, and opposed walls of each opening corresponding to a simulated patent metopic skull suture exhibit an end-to-end configuration.

7. The medical simulator of claim 1, further comprising at least one simulated fused skull suture.

8. The medical simulator of claim 7, wherein each simulated fused skull suture comprises said first material.

9. The medical simulator of claim 7, wherein each simulated fused skull suture comprises an opening within said first material, each opening corresponding to a simulated fused skull structure in which a third material is disposed, an echogenicity of the third material being substantially distinguishable from the echogenicity of the second material, so that each opening corresponding to a simulated fused skull suture can be readily distinguished from an opening corresponding to a simulated patent skull suture in an ultrasound image of said model.

10. The medical simulator of claim 9, wherein the echogenicity of the third material is substantially similar to the echogenicity of the first material, such that in an ultrasound image of the model, portions of the model comprising the first material are not readily distinguishable from portions of the model comprising the third material.

11. The medical simulator of claim 9, wherein the third material comprises a synthetic elastomer.

12. The medical simulator of claim 11, wherein the synthetic elastomer comprises dimethyl siloxane, hydroxy-terminated polymers, and silica.

13. The medical simulator of claim 7, further comprising an opaque layer configured to cover each simulated patent skull suture and each simulated fused skull suture, so that a trainee cannot readily visually determine whether a specific skull suture is patent or fused by visually inspecting the model.

14. The medical simulator of claim 1, further comprising an opaque layer configured to cover a scalp portion of the model, so that a trainee cannot readily visually locate each simulated patent skull suture by visually inspecting the model.

15. A reconfigurable medical simulator adapted to be used to train ultrasound operators to perform craniosynostosis screenings using medical ultrasound, comprising:
(a) a substantially life size model of a human infant head, said model including a plurality of skull suture openings disposed at locations corresponding to a skull suture;
(b) a quantity of a removable first material having an echogenicity such that when the first material is disposed within an opening in the model corresponding to a skull suture, that opening will appear as a patent skull suture in an ultrasound image of the model, the first material comprising a solid or semi-solid hypoechoic material; and
(c) a quantity of a removable second material having an echogenicity such that when the second material is disposed within an opening in the model corresponding to a skull suture, that opening will appear as a fused skull suture in an ultrasound image of the model, the second material comprising an echogenic material, the second material having an echogenicity that is substantially higher than an echogenicity of the first material, the first and second materials enabling a user to selectively reconfigure the model by controlling which of the first and second materials are used to fill specific openings, such that if an opening is filled with the first material to simulate a patent skull suture and the user desires that opening to appear as a fused skull in an ultrasound image of the model, the user removes the first material and fills the opening with the second material, such that the opening will appear as a fused skull suture in an ultrasound image of the model, there being a substantial difference in the echogenicities of the first and second materials, such that the first and second materials are readily distinguishable in an ultrasound image, the first and second materials being elements of the reconfigurable medical simulator.

16. The reconfigurable medical simulator of claim 15, wherein when the medical simulator is imaged using ultrasound and at least one of the plurality of skull suture openings is filled with the first material, the hypoechoic first material produces a relatively dark image, whereas adjacent portions of the model produce a relatively bright image, such that each simulated patent skull suture appears in the ultrasound image as a relatively dark area surrounded by relatively brighter areas.

17. The reconfigurable medical simulator of claim 15, wherein said model is fabricated from a third material having an echogenicity substantially corresponding to the echogenicity of the second material and at least one of the plurality of skull suture openings is filled with the second material to simulate a fused skull suture, such that each simulated fused skull suture cannot be readily distinguished from the third material in an ultrasound image of said model.

18. The reconfigurable medical simulator of claim 15, wherein:
(a) each opening corresponding to a simulated patent skull suture intended to represent a patent coronal skull suture is beveled;
(b) each opening corresponding to a simulated patent skull suture intended to represent a patent lambdoid skull suture is beveled;
(c) each opening corresponding to a simulated patent skull suture intended to represent a patent sagittal skull suture is disposed such that opposed walls of the opening exhibit an end-to-end configuration; and
(d) each opening corresponding to a simulated patent skull suture intended to represent a patent metopic skull suture is disposed such that opposed walls of the opening exhibit an end-to-end configuration.

19. A reconfigurable ultrasound trainer configured to train ultrasound operators to perform craniosynostosis screenings using medical ultrasound, comprising a substantially life size model of a human infant head, said model including at least one replaceable simulated patent skull suture comprising a first material and at least one replaceable simulated fused skull suture comprising a second material, an echogenicity of the first material being substantially lower than an echogenicity of the second material, such that each replaceable simulated patent skull suture is readily distinguishable from each replaceable simulated fused skull suture in an ultrasound image of said model, such that each replaceable simulated patent skull suture will appear dark in such an ultrasound image, and each replaceable simulated fused skull suture will appear bright in such an ultrasound image, each replaceable simulated patent skull suture and each replaceable simulated fused skull suture being interchangeable, such that a user can change the relative locations of each replaceable simulated patent skull suture and each replaceable simulated patent skull suture to reconfigure the ultrasound trainer.

20. A reconfigurable medical simulator for training ultrasound operators to perform craniosynostosis screenings using medical ultrasound, comprising a substantially life-size model of a human infant head, said model including two eyes, a mouth, two ears, and a plurality of openings, each opening simulating a skull suture, at least one of the plurality of openings being filled with a removable first material to simulate a patent skull suture, and at least one of the plurality of openings being filled with a removable second material to simulate a fused skull suture, an echogenicity of the removable first material being substantially lower than an echogenicity of the removable second material, a difference in echogenicity of the removable first material in each simulated patent skull suture and the removable second material in each simulated fused skull suture enabling each simulated patent skull suture to be readily distinguishable from non suture portions of the model and from each simulated fused suture in an ultrasound image of said model, the removable first material and the removable second material being interchangeable, such that a user can change the relative locations of each simulated patent skull suture and each simulated fused skull suture to reconfigure the ultrasound trainer.

21. A medical simulator for training ultrasound operators to perform craniosynostosis screenings using medical ultrasound, comprising a substantially life size model of a human head, said model being at least in part fabricated from a first material, said model including:
(a) at least one simulated patent skull suture being at least in part fabricated from a second material, said second material comprising at least one of a solid and a semi-solid, an echogenicity of said second material being substantially lower than an echogenicity of said first material, such that each simulated patent skull suture can be readily distinguished in an ultrasound image of said model; and
(b) at least one simulated fused skull suture, wherein each simulated fused skull suture comprises an opening within said first material, a third material being disposed within each opening corresponding to a simulated fused skull structure, an echogenicity of the third material being substantially higher than the echogenicity of the second material, so that each simulated fused skull suture can be readily distinguished from each simulated patent skull suture in an ultrasound image of said model.

22. The medical simulator of claim 21, wherein the echogenicity of the third material is substantially similar to the echogenicity of the first material, such that in an ultrasound image of the model, portions of the model comprising the first material are not readily distinguishable from portions of the model comprising the third material.

23. The medical simulator of claim 21, wherein the third material comprises a synthetic elastomer.

24. A medical simulator adapted to be used to train ultrasound operators to perform craniosynostosis screenings using medical ultrasound, comprising a substantially life size model of a human head, said model including:
(a) at least one opening corresponding to a simulated patent skull suture, a solid or semi-solid hypoechoic material being disposed within each such opening to enhance a difference in an echogenicity of the simulated skull suture relative to that of portions of the model not corresponding to the simulated patent skull suture, the difference enabling each simulated patent skull suture to be identified in an ultrasonic image, said model being fabricated from a first material, such that the solid or semi-solid hypoechoic material disposed within each opening corresponding to a simulated patent skull suture represents a second material, an echogenicity of the second material being substantially lower than the echogenicity of the first material, so that each opening corresponding to a simulated patent skull suture can be readily distinguished from the first material in an ultrasound image of said model; and (b) at least one opening corresponding to a simulated fused skull suture, a third material being disposed within each opening corresponding to a simulated fused skull suture, an echogenicity of the third material being substantially higher than the echogenicity of the second material, so that each opening corresponding to a simulated fused skull suture can be readily distinguished from an opening corresponding to a simulated patent skull suture in an ultrasound image of said model.

25. A reconfigurable medical simulator adapted to be used to train ultrasound operators to perform craniosynostosis screenings using medical ultrasound, comprising:

(a) a substantially life size model of a human infant head, said model including a plurality of skull suture openings;

(b) a first material provided for use with the reconfigurable medical simulator to enable a skull suture opening to appear as a patent skull suture in an ultrasound image of the reconfigurable medical simulator when the first material is introduced into that opening, the first material comprising a solid or semi-solid hypoechoic material, and the first material comprising a mixture of starch and glue; and (c) a second material provided for use with the reconfigurable medical simulator to enable a skull suture opening to appear as a fused skull suture in an ultrasound image of the reconfigurable medical simulator when the second material is introduced into that opening, the second material comprising a material that is substantially more echogenic than the first material, such that each skull suture opening filled with the first material can be readily distinguished from each other skull suture opening filled with the second material in an ultrasound image, such that the first and second materials can be selectively inserted into the skull suture openings before acquiring the ultrasound image, the second material comprising a solid or semi-solid echoic material having an echogenicity substantially similar to portions of the skull adjacent to the plurality of skull suture openings, so that in the ultrasound image of the model each skull opening filled with the second material is not substantially distinguishable from the portions of the skull adjunct to that opening, there being a substantial difference in the echogenicities of the first and second materials, such that the first and second materials are readily distinguishable in an ultrasound image, the first and second materials being elements of the reconfigurable medical simulator, the second material comprising a silicone based elastomer.

\* \* \* \* \*